United States Patent
King et al.

(10) Patent No.: US 7,099,776 B2
(45) Date of Patent: *Aug. 29, 2006

(54) GPS-BASED VEHICLE WARNING AND LOCATION SYSTEM AND METHOD

(76) Inventors: Byron King, 556 Black Bear Trail, Carbondale, CO (US) 81623; Drew A. Yancey, 17236 E. Kensington Pl., Fountain Hills, AZ (US) 85268

( * ) Notice: Subject to any disclaimer, the term of this patent is extended or adjusted under 35 U.S.C. 154(b) by 0 days.

This patent is subject to a terminal disclaimer.

(21) Appl. No.: 11/107,864

(22) Filed: Apr. 18, 2005

(65) Prior Publication Data

US 2005/0192746 A1    Sep. 1, 2005

Related U.S. Application Data

(63) Continuation of application No. 10/421,819, filed on Apr. 24, 2003, now Pat. No. 6,895,332, which is a continuation-in-part of application No. 10/347,364, filed on Jan. 21, 2003.

(51) Int. Cl.
*G08G 1/00* (2006.01)

(52) U.S. Cl. .................. 701/213; 701/301; 340/902; 340/903; 340/988; 342/455

(58) Field of Classification Search ............ 701/213, 701/301; 340/902, 903, 435, 436, 988, 933, 340/905, 907, 937; 455/404; 342/386, 357.06; 382/104, 113
See application file for complete search history.

(56) References Cited

U.S. PATENT DOCUMENTS 2,028,497 A    1/1936 Clausing et al.

3,235,025 A    2/1966 Quinn
3,772,692 A    11/1973 Braddon (Continued)

FOREIGN PATENT DOCUMENTS

DE    100 07 573 C1    9/2001

(Continued)

OTHER PUBLICATIONS

Article—"Invehicle Safety Advisory and Warning System (IVSAWS)", vol. 1, Executive Summary, U.S. Department of Transportation, Publication No. FHWA-RD-94-061, Mar. 1996, pp. 1-24.

(Continued)

*Primary Examiner*—Jack Keith
*Assistant Examiner*—Tuan C. To
(74) *Attorney, Agent, or Firm*—Foley & Lardner LLP (57) ABSTRACT

An emergency vehicle alert system includes a first GPS receiving unit that is provided on the emergency vehicle and that determines emergency vehicle location information of the emergency vehicle. The system also includes a radio-wave transmitter unit that is provided on the emergency vehicle and that transmits the emergency vehicle location information by way of an emergency vehicle location signal. The system further includes a second GPS receiving unit that is provided on the motor vehicle and that determines vehicle location information of the motor vehicle. The system also includes a radio-wave receiver unit that is provided on the motor vehicle and that receives the emergency location signal output by the radio-wave transmitter unit of the emergency vehicle. The system further includes a map display that displays, on a map, a current location of the motor vehicle and a current location of the emergency vehicle. The emergency vehicle is shown as an icon on the map, which has a different visual characteristic depending on the position of the emergency vehicle with respect to the motor vehicle.

16 Claims, 5 Drawing Sheets

U.S. PATENT DOCUMENTS

| | | | |
|---|---|---|---|
| 3,854,119 A | 12/1974 | Friedman et al. | |
| 3,876,940 A | 4/1975 | Wickord et al. | |
| 3,997,868 A | 12/1976 | Ribnick et al. | |
| 4,238,778 A | 12/1980 | Ohsumi | |
| 4,403,208 A | 9/1983 | Hodgson et al. | |
| 4,623,966 A | 11/1986 | O'Sullivan | |
| 5,068,654 A | 11/1991 | Husher | |
| 5,111,210 A | 5/1992 | Morse | |
| 5,153,836 A | 10/1992 | Fraughton et al. | |
| 5,249,157 A | 9/1993 | Taylor | |
| 5,303,259 A | 4/1994 | Loveall | |
| 5,307,060 A | 4/1994 | Prevulsky et al. | |
| 5,307,074 A | 4/1994 | Janex | |
| 5,314,037 A | 5/1994 | Shaw et al. | |
| 5,317,321 A | 5/1994 | Sass | |
| 5,430,656 A | 7/1995 | Dekel et al. | |
| 5,450,329 A | 9/1995 | Tanner | |
| 5,471,214 A | 11/1995 | Faibish et al. | |
| 5,495,243 A | 2/1996 | McKenna | |
| 5,506,590 A | 4/1996 | Minter | |
| 5,515,026 A * | 5/1996 | Ewert | 340/436 |
| 5,554,982 A | 9/1996 | Shirkey et al. | |
| 5,572,201 A | 11/1996 | Graham et al. | |
| 5,620,155 A | 4/1997 | Michalek | |
| 5,635,923 A | 6/1997 | Steele et al. | |
| 5,636,122 A | 6/1997 | Shah et al. | |
| 5,636,123 A | 6/1997 | Rich et al. | |
| 5,736,962 A | 4/1998 | Tendler | |
| 5,757,284 A | 5/1998 | Trizzino et al. | |
| 5,801,646 A | 9/1998 | Pena | |
| 5,808,560 A | 9/1998 | Mulanax | |
| 5,872,526 A | 2/1999 | Tognazzini | |
| 5,890,682 A | 4/1999 | Welk | |
| 5,914,675 A | 6/1999 | Tognazzini | |
| 5,983,161 A | 11/1999 | Lemelson et al. | |
| 6,002,345 A | 12/1999 | Ohmura et al. | |
| 6,038,502 A | 3/2000 | Sudo | |
| 6,049,755 A * | 4/2000 | Lou et al. | 701/207 |
| 6,087,961 A | 7/2000 | Markow | |
| 6,160,493 A * | 12/2000 | Smith | 340/902 |
| 6,326,903 B1 | 12/2001 | Gross et al. | |
| 6,339,382 B1 * | 1/2002 | Arbinger et al. | 340/903 |
| 6,384,776 B1 * | 5/2002 | Martin | 342/357.09 |
| 6,404,351 B1 | 6/2002 | Beinke | |
| 6,405,125 B1 | 6/2002 | Ayed | |
| 6,417,782 B1 | 7/2002 | Darnall | |
| 6,529,831 B1 * | 3/2003 | Smith et al. | 701/301 |
| 6,549,916 B1 | 4/2003 | Sedlar | |
| 6,574,547 B1 | 6/2003 | MacPhail et al. | |
| 6,580,997 B1 | 6/2003 | MacPhail et al. | |
| 6,614,362 B1 * | 9/2003 | Siegel | 340/902 |
| 2001/0038344 A1 * | 11/2001 | Garcia | 340/902 |
| 2002/0008635 A1 * | 1/2002 | Ewing et al. | 340/902 |
| 2002/0198660 A1 * | 12/2002 | Lutter et al. | 701/301 |
| 2003/0090392 A1 | 5/2003 | Schuessler | |
| 2003/0141990 A1 * | 7/2003 | Coon | 340/902 |
| 2003/0169181 A1 | 9/2003 | Taylor | |
| 2003/0169185 A1 | 9/2003 | Taylor | |

FOREIGN PATENT DOCUMENTS

| | | |
|---|---|---|
| EP | 1 223 567 A1 | 7/2002 |
| WO | WO 00/11631 | 3/2000 |
| WO | WO 02/103653 A1 | 12/2002 |

OTHER PUBLICATIONS

Article—"Intelligent Transportation Systems in Work Zones—A Cross-Cutting Study", Published Nov., 2002, pp. 1-35.

Article—"Invehicle Safety Advisory and Warning System (IVSAWS)," vol. II, Final Report, U.S. Department of Transportation, Publication No. FHWA-RD-94-190, Mar., 1996, pp. 1-257.

Web Site for Magellan, "Driving Adventures," 2 pp. (Thales Navigation, Inc. 2003), available at http://www.magellangps.com/en/gpsAdventures/driving/road.asp.

Web Site for Tiger GPS & Marine Electronics, "Magellan 750NAV Plus Vehicle Navigation GPS System," 3 pp. (TigerGPS.com, Ltd. 2003), available at http://www.tigergps.com/mag750navyeh.html.

Web Site for gizmo.com.au, "Black Spot Road Angel—accident prevention technology," 2 pp. (2003), available at http://gizmo.com.au/public/News/news.asp?articleid=1970.

Web Site for Seattle Post-Intelligencer, "Venture Capital: Dashboard device helps navigate road jams," Seattle Post-Intelligencer, 4 pp. (Jun. 13, 2003).

Web Site for reviewjournal.com, Omar Sofradzija, "Official: Safety Sells Cars," Review-Journal, Jan. 31, 2004, 2 pp.

Web Site for telematicsupdate.com, "Private Inventor files patent application for telematics-based In-car advisory system," telematics UPDATE, Feb. 12, 2004, 2 pp.

* cited by examiner

GPS-BASED VEHICLE WARNING AND LOCATION SYSTEM AND METHOD

RELATED APPLICATIONS

This application is a Continuation of U.S. patent application Ser. No. 10/421,819, filed Apr. 24, 2003, now U.S. Pat. No. 6,895,332, which is a Continuation-In-Part (CIP) of U.S. patent application Ser. No. 10/347,364, filed on Jan. 21, 2003, both of which are incorporated by reference in their entireties.

BACKGROUND OF THE INVENTION

1. Field of the Invention

The present invention relates to a method and apparatus for providing GPS based vehicle warning and location information to a vehicle operator.

2. Description of the Related Art

Emergency vehicles need to travel quickly and safely through traffic in order to get to a destination. Conventional emergency vehicles use either sirens or emergency lights, or both, in order to get to the destination quickly and safely. It is often the case that a driver who is on the same road or a nearby road as the emergency vehicle is not made aware of the emergency vehicle's presence. This may be the case when the driver has poor hearing, is listening to the car radio, is on his or her car phone, etc. When this occurs, it may result in a dangerous situation when the emergency vehicle approaches the unaware driver, which may result in the driver causing an accident with the emergency vehicle or with another nearby vehicle on the road.

Also, when an emergency vehicle comes to an intersection, it is important that all vehicles approaching the intersection in different directions are made aware of the approaching emergency vehicle. Again, some drivers may not be aware of the sirens and emergency lights of the emergency vehicle, and this may result in an accident occurring with the emergency vehicle and/or other vehicles at or near the intersection.

There have been some solutions proposed to address this problem. One solution has been to use optical detectors at an intersection that detect light signals emitted from an approaching emergency vehicle, whereby the optical detectors would manipulate the traffic signal for oncoming traffic. One drawback to this solution is the lack of warning when an emergency vehicle is coming from behind a motor vehicle.

Another solution has been to use a radar detector, which would detect a signal transmitted from an emergency vehicle. One drawing to this solution is that false triggering of the radar may result in a driver turning off the radar detector out of frustration. Furthermore, the location and distance of the emergency vehicle would not be made available to the driver with this solution.

Yet another solution is to have the emergency vehicle transmit a radio frequency (RF) signal at a predetermined frequency or frequency range. In this case, each motor vehicle would be equipped with an RF receiver which would receive the RF signal output by the emergency vehicle when the emergency vehicle is traveling to its destination. A further enhancement to this solution would be to utilize GPS in order to provide information as to the location of the emergency vehicle relative to the motor vehicle, whereby that information would be used by a microcontroller in order to determine the location of the emergency vehicle with respect to the driver's vehicle. The emergency vehicle's location would be displayed at the motor vehicle by way of one of four indicator lamps that are in the driver's view area (e.g., on the dashboard). Actuation of a first lamp would indicate that the emergency vehicle was somewhere ahead of the driver's vehicle, actuation of a second lamp would indicate that the emergency vehicle was somewhere to the left of the driver's vehicle, actuation of a third lamp would indicate that the emergency vehicle was somewhere to the right of the driver's vehicle, and actuation of a fourth lamp would indicate that the emergency vehicle was somewhere behind the driver's vehicle.

The above solution using both GPS signals and an RF transmitter and RF receiver is described in U.S. Pat. No. 6,339,382, issued to Donald Arbinger et al., which is incorporated in its entirety herein by reference. However, even with the Arbinger et al. solution, a driver is not provided precise information as to the exact location of the emergency vehicle, and so the driver may not choose the best streets to travel through in order to evade the emergency vehicle and to evade the snarled traffic that typically occurs on streets that the emergency vehicle travels on.

SUMMARY OF THE INVENTION

According to one aspect of the invention, there is provided an emergency vehicle alert system for providing information as to a location of an emergency vehicle to a motor vehicle. The system includes a first GPS receiving unit that is provided on said emergency vehicle and that is configured to receive at least three different GPS signals from at least different GPS satellites and to determine emergency vehicle location information of said emergency vehicle as a result thereof. The system also includes a radio-wave transmitter unit that is provided on said emergency vehicle and that is configured to transmit said emergency vehicle location information by way of an emergency vehicle location signal that includes said emergency vehicle location information. The system further includes a second GPS receiving unit that is provided on said motor vehicle and that is configured to receive at least three different GPS signals from at least three different GPS satellites and to determine vehicle location information of said motor vehicle as a result thereof. The system still further includes a radio-wave receiver unit that is provided on said motor vehicle and that is configured to receive the emergency location signal output by said radio-wave transmitter unit of said emergency vehicle. The system also includes a map display that is provided on said motor vehicle and that is configured to display, on a map that includes a plurality of street locations provided thereon, a current location of said motor vehicle as provided by the vehicle location information, and the map display configured to display, on the map, a current location of said emergency vehicle as provided by the emergency vehicle location information obtained from the emergency vehicle location signal received by said radio-wave receiver unit when said radio-wave receiver unit is in radio-wave communication range with respect to said radio-wave transmitter unit.

According to another aspect of the invention, there is provided an emergency vehicle that provides a warning indication to other vehicles. The emergency vehicle includes a GPS receiving unit that is configured to receive at least three different GPS signals from at least different GPS satellites and to determine emergency vehicle location information of said emergency vehicle as a result thereof. The emergency vehicle also includes a radio-wave transmitter unit that is configured to transmit said emergency vehicle location information by way of an emergency vehicle location signal that includes said emergency vehicle location information. The emergency vehicle further includes a radio-wave receiving unit that is configured to receive radio-wave signals from at least one other emergency vehicle that include information as to a current location of the at least one other emergency vehicle. The emergency vehicle still further includes a controller that is configured to determine a latitude and longitude position of said emergency vehicle based on the at least three different GPS signals, and to determine a latitude and longitude position of said at least one other emergency vehicle based on the received radio-wave signals. The emergency vehicle also includes a map display that is configured to display, on a map that includes a plurality of street locations provided thereon, a current location of said emergency vehicle and said at least one other emergency vehicle.

According to yet another aspect of the invention, there is provided an emergency vehicle alert system that is provided on a motor vehicle. The system includes a GPS receiving unit that is configured to receive at least three different GPS signals from at least different GPS satellites and to determine vehicle location information of said motor vehicle as a result thereof. The system also includes a radio-wave receiver unit that is configured to receive an emergency vehicle location signal output by an emergency vehicle. The system further includes a map display that is configured to display, on a map that includes a plurality of street locations provided thereon, a current location of said motor vehicle as provided by the vehicle location information as determined by said GPS receiving unit, and the map display configured to display, on the map, a current location of said emergency vehicle as obtained from the emergency vehicle location signal received by said radio-wave receiver unit when said radio-wave receiver unit is in radio-wave communication range with respect to said emergency vehicle.

According still yet another aspect of the invention, there is provided an emergency vehicle alert method that provides information as to a location of an emergency vehicle to a motor vehicle. the method includes receiving, by said emergency vehicle, at least three different GPS signals from at least different GPS satellites, and determining emergency vehicle location information of said emergency vehicle as a result thereof. The method also includes transmitting, by said emergency vehicle, said emergency vehicle location information by way of an emergency vehicle location signal. The method further includes receiving, by said motor vehicle, at least three different GPS signals from at least three different GPS satellites, and determining vehicle location information of said motor vehicle as a result thereof. The method still further includes receiving, when the motor vehicle is within a predetermined distance of said emergency vehicle, the emergency location signal output by said emergency vehicle. The method also includes displaying, on a map that includes a plurality of street locations provided thereon, a) a current location of said motor vehicle as provided by the vehicle location information, and b) a current location of said emergency vehicle as obtained from said emergency vehicle location signal.

BRIEF DESCRIPTION OF THE DRAWINGS

The embodiments of the present invention will become more fully apparent from the following detailed description when read in conjunction with the accompanying drawings with like reference numerals indicating corresponding parts throughout, wherein.

DETAILED DESCRIPTION OF THE INVENTION

Different embodiments of the invention will be explained below with reference to the accompanying drawings.

Figure 1:
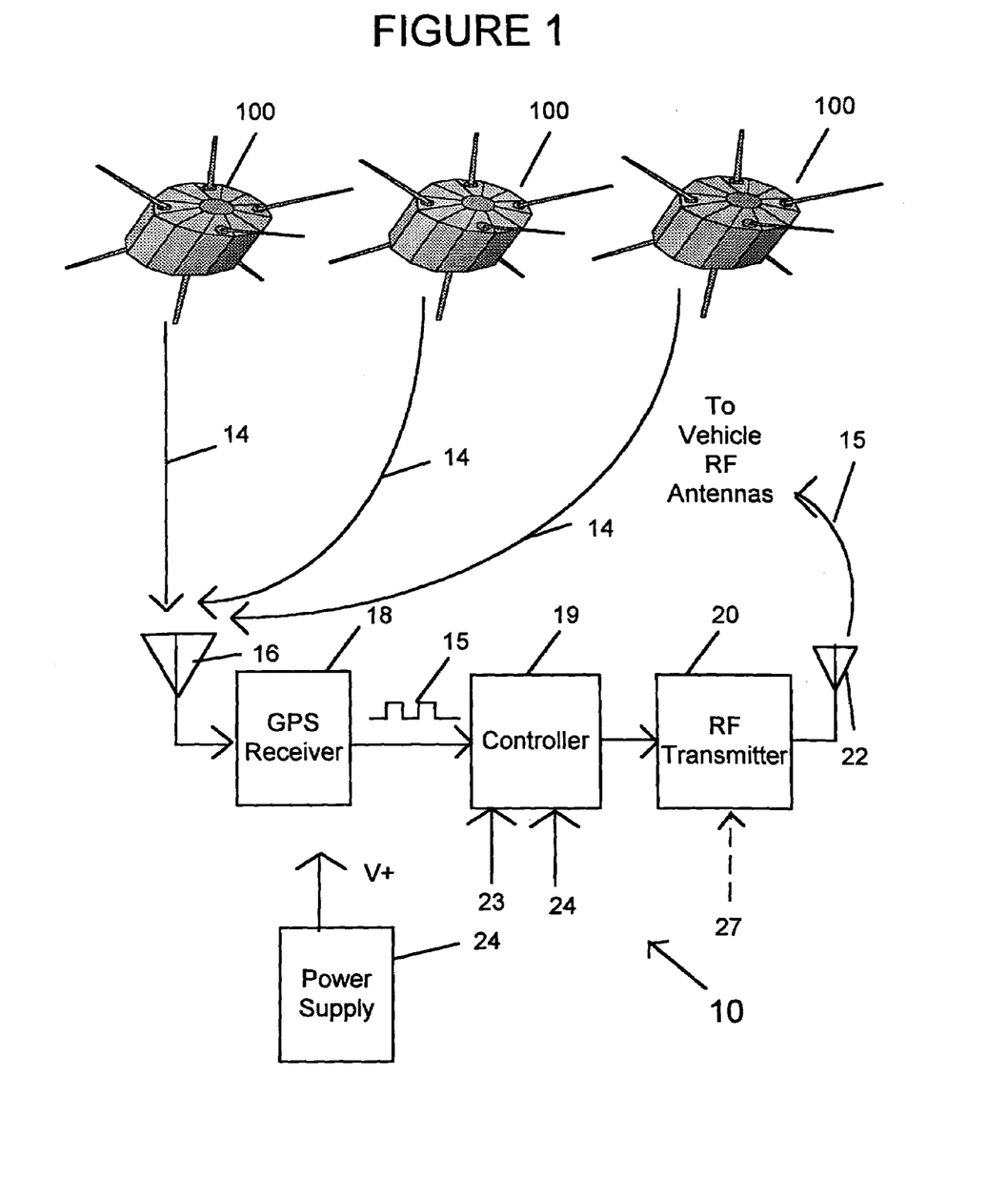
FIG. 1 is a diagram showing elements utilized in an emergency vehicle in accordance with a first embodiment of the invention.

Referring now to FIG. 1, an emergency vehicle unit 10 of an emergency vehicle alert system is shown. The emergency vehicle alert system includes one or more emergency vehicle units, one or more motor vehicles, and a plurality of global positioning system (GPS) satellites 100 that each output GPS signals 14. The emergency vehicle unit 10, which may be a fire truck, a school bus, or a police car, for example, includes an emergency GPS antenna 16, an emergency GPS receiver 18, a controller 19, an RF transmitter 20, an emergency RF antenna 22, and an emergency power source 24. The emergency power source 24 supplies electrical power to the electronic components in the emergency vehicle unit 10.

Figure 2:
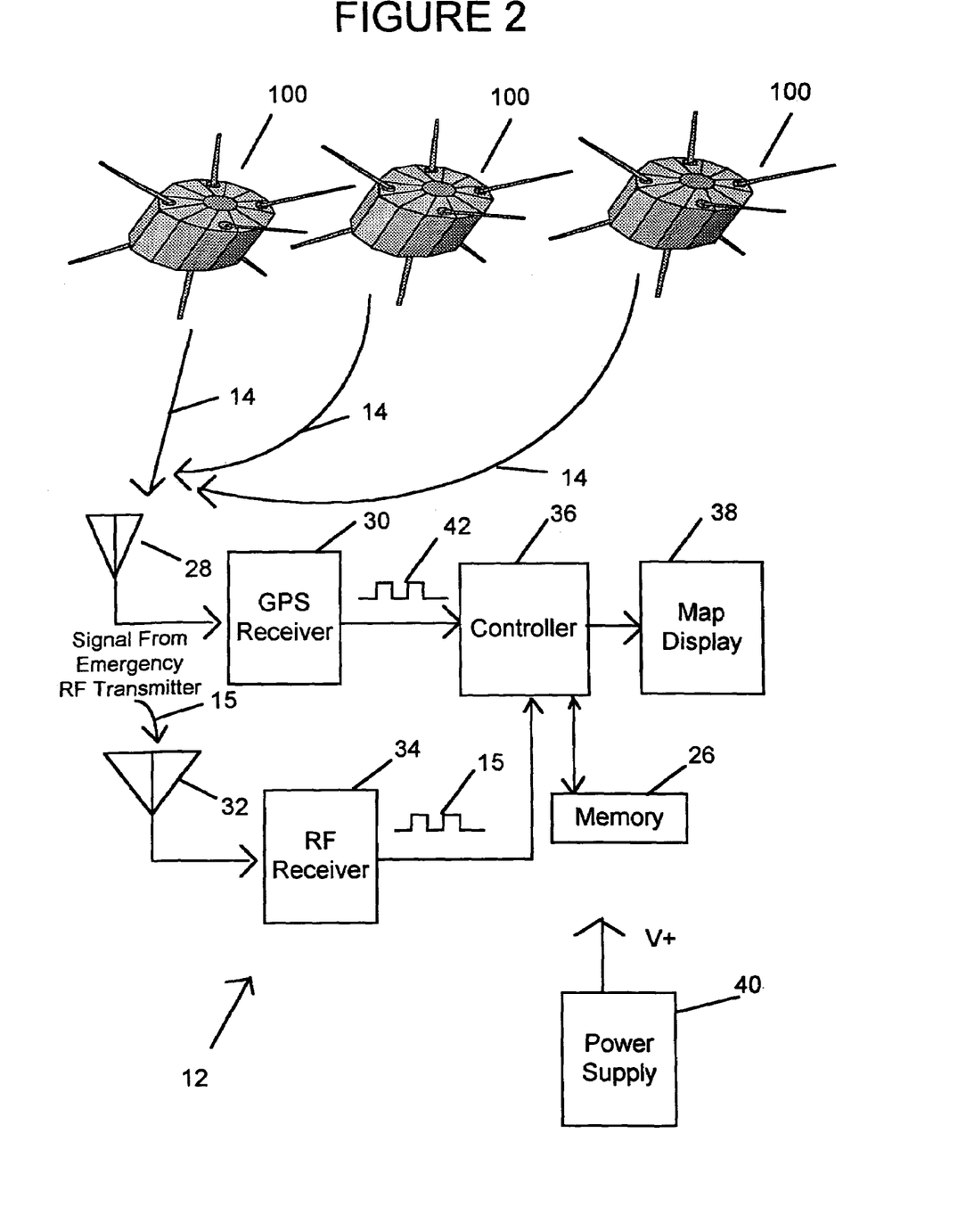
FIG. 2 is a diagram showing elements utilized in a motor vehicle in accordance with the first embodiment of the invention.

Referring now to FIG. 2, the motor vehicle unit 12 includes a vehicle GPS antenna 28, a vehicle GPS receiver 30, a vehicle RF antenna 32, a vehicle RF receiver 34, a controller 36, a map display 38, and a vehicle power source 40. The vehicle power source 40 supplies electrical power to the electrical components in the motor vehicle unit 12.

Referring back to FIG. 1, the plurality of GPS satellites 100 output respective GPS signals 14, whereby the emergency GPS antenna 16 receives at least three GPS signals 14 from the plurality of GPS satellites 100. The at least three GPS signals 14 are input to the emergency GPS receiver 18. The emergency GPS receiver 18 triangulates the plurality of GPS signals 14 into an emergency location signal string 15 which is described by a particular longitude and latitude. The emergency location signal string 15 is input to the controller 19. The controller 19 provides output to the RF transmitter 20, whereby that output is transmitted through the emergency RF antenna 22. The RF transmitter 20 is preferably a low powered radio transmitter, which has a specific, exclusive bandwidth and that covers an area of approximately ½ mile in radius. The bandwidth exclusivity is desirable so that other RF signals do not interfere with the emergency vehicle's RF transmission, and with the reception of that signal by one or more motor vehicle units.

The controller 19 provides a switch function for the emergency vehicle 12, whereby when a sensor input signal 23 indicates that a warning signal is to be output, the controller 19 passes the location signal string 15 received from the GPS receiver 18 to the RF transmitter 20. One sensor input signal may be when a school bus activates its yellow or red lights, whereby only at-those-times will warning signals be output from the school bus. Another sensor input signal may be when a police car is traveling faster than a predetermined rate of speed (e.g., >65 miles per hour) to catch a suspected criminal. Another input to the controller 19 is an override signal 24, which is used so as to deactivate the emergency warning system even when the sensor input signal 23 is in an active state. The override signal 24 may be used, for example, when a police vehicle is on a car chase and does not want the current location of the police vehicle to be known to other nearby vehicles, since one of those nearby vehicles may very well be the vehicle of a suspected criminal that is being chased by the police vehicle.

Referring now to FIG. 2, each motor vehicle unit 12 that is within range of the emergency vehicle transmission will receive the emergency location signal string 15 through the vehicle RF antenna 32. The RF receiver 34 takes the analog signal from the vehicle RF antenna 32, and transforms it back into its original digital data string, which is provided to the controller 36. The controller 36 utilizes that information to determine the precise latitude and longitude of the emergency vehicle unit 10, in a manner known to those skilled in the art.

The vehicle GPS antenna 28 receives at least three GPS signals 14 from the plurality of GPS satellites 100 that are within its line of sight. The at least three different GPS signals 14 are input to the vehicle GPS receiver 30, by way of the GPS antenna 28. The vehicle GPS receiver 30 outputs a motor vehicle location signal string 42, which is received by the controller 36. The controller 36 uses that information to determine the precise latitude and longitude of the motor vehicle unit 12, in a manner known to those skilled in the art.

Figure 3:
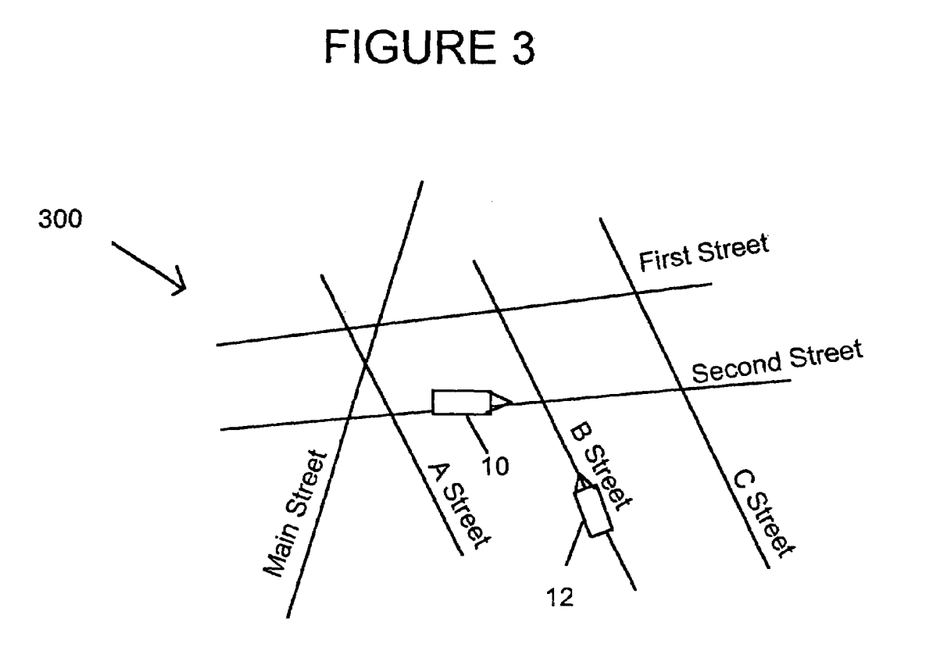
FIG. 3 is a diagram showing a map display that may be provided to a driver of a motor vehicle, in accordance with the first embodiment of the invention.

FIG. 3 shows a map display 300 that is displayed on the warning display 38 according to a first embodiment of the invention, whereby the map display 300 provides, to a driver of the motor vehicle unit 12, both the precise position of the emergency vehicle unit 10 and the precise position of the motor vehicle unit 12. The map display is a street map showing the street that the motor vehicle unit 12 is currently located, as well as the surrounding streets within a particular range. For example, the map display 300 may include a map of streets that are within a 3 mile radius of a point from where the motor vehicle unit 12 is currently located. The map display 300 preferably has a feature in which it can be zoomed in or zoomed out by operator control, so that the driver can get a better perspective as to the location of his/her motor vehicle unit 12 and the emergency vehicle unit 10, with respect to a particular region.

Figure 4:
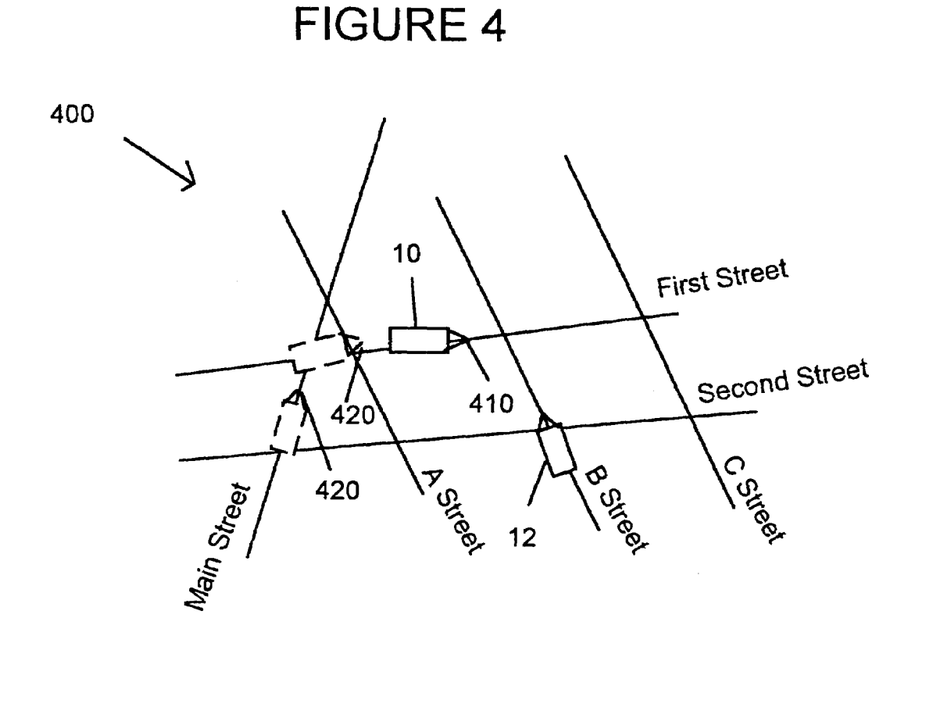
FIG. 4 is a diagram showing a map display that may be provided to a driver of a motor vehicle, in accordance with a second embodiment of the invention.

FIG. 4 shows a map display 400 that is displayed on the warning display 38 according to a second embodiment of the invention, whereby all elements except for the map display are the same as those described with respect to the first embodiment. In the second embodiment, the map display 400 shows a current location 410 of the emergency vehicle unit 10, as well as the most previous location or locations 420 of the emergency vehicle unit 10. With that information, the driver of the motor vehicle unit 12 can determine a direction in which the emergency vehicle unit 10 is heading, so that the driver of the motor vehicle unit 12 can decide on a driving path in order to not get in the way of the driving path of the emergency vehicle unit 10. The current location 410 may be shown with a particular icon or color on the map display 400, in order to easily distinguish it from the previous locations 420 that are also shown on the map display 400. In FIG. 4, the previous locations 420 are shown as dashed vehicle icons.

In either the first or second embodiments, the map display 300, 400 is preferably a liquid crystal display (LCD), but other ways of displaying the location of the emergency vehicle unit 10 and the motor vehicle unit 12 on a road/street map may be utilized (e.g., cathode ray tube display), while remaining within the scope of the invention as described herein.

In a preferred implementation of the first and second embodiments, the emergency GPS antenna 16 is mounted permanently on all police, fire, ambulance, school buses and other types of emergency/public safety equipment. The elements shown in FIG. 1 will preferably be running constantly when the emergency vehicle unit 10 is operating, and will have a start up and continuous diagnostic cycle to insure proper operation. For example, the emergency vehicle unit 10 will begin broadcasting RF signals when flashing lights are initiated in the emergency vehicle unit 10.

In a third embodiment of the invention, the emergency location signal string 15 is output from one or more stationary locations that do not correspond to motor vehicles. For example, in the morning and in the afternoon when school children are walking to or from a school, a school crosswalk will have an RF transmitter that broadcasts its precise latitude and longitude information, so that motor vehicles can stay clear of this zone or approach the zone with caution while children are walking on the street to and from the school. A similar feature can be utilized at a railroad crossing, and at locations (e.g., fire stations) where emergency vehicles enter traffic from their station locations, and at work zones on roadways in order to give drivers information regarding the presence of workers and equipment on or near a road that the driver is either on or close to. The same would apply to rail maintenance workers, and crosswalks for handicapped individuals at designated crosswalks. This would allow adequate time for the handicapped to cross by using a portable sending unit and a timed sequence that can be adjusted.

In a fourth embodiment, which is a variation of the first and second embodiments, the precise latitude and longitude of the emergency vehicle unit 12 will be constantly broadcast in a ½ mile radius, except in the case of police vehicles or other types of emergency vehicles that may have to drive at high rates of speed, in which they will utilize a speed sensor that will automatically increase the radio transmission signal strength cover a broader area (e.g., 1 mile radius), as needed, in order to give motorists in their vicinity sufficient advance notice of their approach. FIG. 1 shows a dashed line 27 that corresponds to a speed signal that is used to control the output power of the emergency RF transmitter 20. The speed signal 27 is shown as a dashed line since it is not a part of the first embodiment, and is only used in the fourth embodiment. In cases where a police vehicle does not want his or her current position know, such as in the case when the police vehicle is chasing a bank robber's getaway vehicle, the police vehicle has the means to deactivate the emergency warning RF broadcast, by way of the override signal 24, so that the bank robber will not know the current location of the police vehicle or vehicles that are trying to catch the bank robber.

Each motor vehicle unit 12 in any of the embodiments described above has a map display, which is preferably an LCD screen that is provided on a dashboard of the motor vehicle unit 12. The LCD screen is preferably capable of mapping the entire continental United States, for a vehicle to be sold and used in the United States. That way, when the vehicle is moved from one state to another, no changes need to be made in order to utilize the emergency vehicle warning and location system and method in the other state. Of course, for other regions, such as Europe, a corresponding map having all street locations in Europe is installed in the motor vehicle unit 12 for use in Europe. Preferably, the street/road maps are updated very two years, in order to reflect the current road and street layout for a particular area.

The present invention is also useful when two or more emergency vehicles, such as two police vehicles, are in the same area, such as when they are approaching the same intersection from different directions. In that case, using the system and method as described above, each police vehicle will be provided with current positioning of the other police vehicle, and so a potential collision can be greatly avoided. Police cars in this instance will include all of the features shown in FIG. 1, as well as the RF Antenna 32 and the Map Display 38 as shown in FIG. 2 (in order to receive warning signals from other nearby emergency vehicles).

Figure 5:
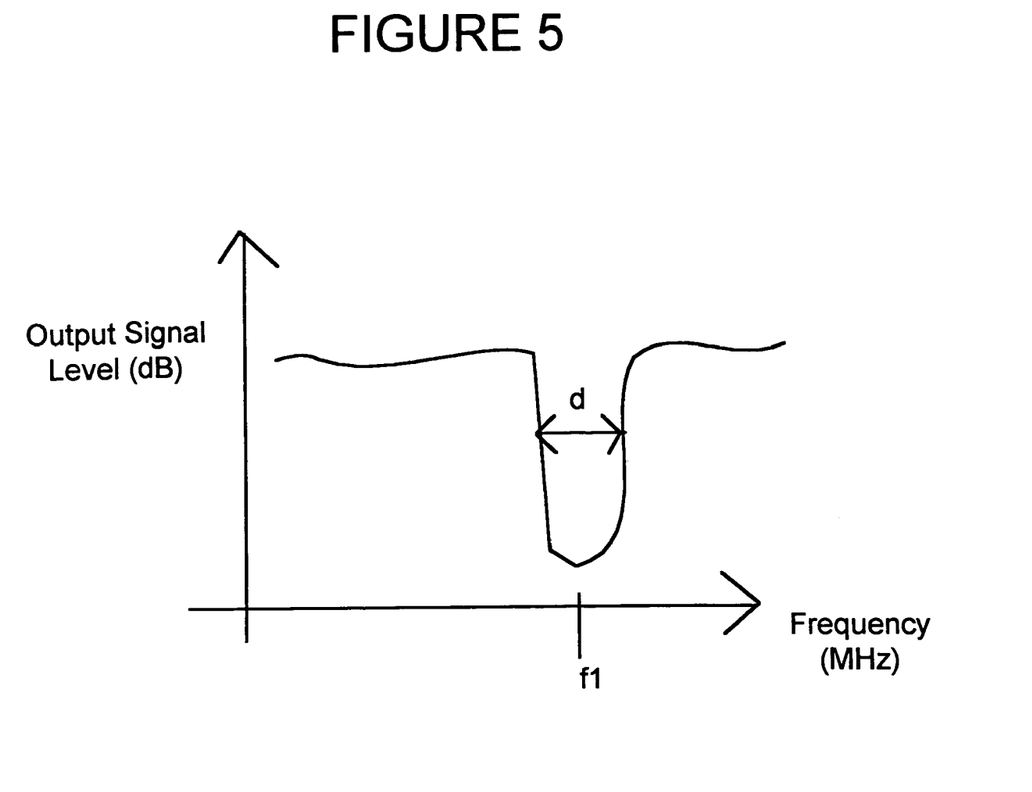
FIG. 5 is a frequency plot of a notch filter that is utilized in an emergency vehicle, in accordance with a fourth embodiment of the invention.

Furthermore, the emergency vehicle will utilize a notch filter having output signal versus frequency characteristics 500 as shown in FIG. 5. The notch filter will be provided along a communications path between the RF antenna 32 and the RF receiver 34 of FIG. 2, whereby the notch filter will notch out any RF transmissions made by the emergency vehicle's own emergency warning system (centered at frequency f1 with a notch bandwidth of d), while at the same time passing through emergency signals from other emergency vehicles that output RF warning signals at frequencies other than the one used by the emergency vehicle.

In a preferred implementation, the warning display 38 of the different embodiments described above will normally be blank, and will activate when emergency signals are detected. The system and method of the different embodiments also may include an audio output, which will provide synthesized speech that audibly notifies a driver where the emergency vehicle and/or other designation emergency locations (e.g., handicapped road crossing, school crossing) are located and the direction of movement of the emergency vehicle. In a preferred implementation, the system operates whether or not the car radio is turned ON or OFF. If a car tapeplayer or car compact disk (CD) player is currently turned ON, the system according to the invention will override these other audio functions, so that the motorist is not distracted away from a potential upcoming emergency situation. In one implementation, the system according to the invention is constantly in operation in a stand-by mode when the motorist's vehicle is in operation (e.g., when the key in the ignition is engaged), whereby there is no need for operator input to activate the system according to the invention. The synthesized speech provided to the motorist in order to audibly alert the motorist of an emergency situation on the road is preferably output through the radio speakers of the motor vehicle unit 12, or by separate speakers in an alternative configuration. The GPS feature described above may incorporate navigational features as are currently available on many models of private and business vehicles, whereby those features would automatically cancel whenever emergency vehicles are detected.

The frequency band allocated for the emergency vehicle RF transmissions is preferably large enough in order to accommodate several different emergency vehicles operating close to each other. For example, if the allocated frequency band is from 3.100 to 3.200 MHz, then 100 kHz of frequency bandwidth is available. If each emergency vehicle is allocated a 5 kHz emergency signal bandwidth (including guard band), then up to 20 emergency vehicles can operate in close proximity to each other, without causing any problems with respect to detection at a motor vehicle unit 12 of the respective emergency signals output by these 20 emergency vehicles. As one example, the particular frequency range utilized by an emergency vehicle may be randomly selected within the operating frequency band, in order to lessen the chance that two emergency vehicles are operating in the exact same frequency range and are operating very close to each other. Also, by using the notch filter having the input/output characteristics 500 as shown in FIG. 5, an emergency vehicle can output its own emergency signal while at the same time receive emergency signals from other emergency vehicles (that are used to map the locations of those other emergency vehicles on a map display on a dashboard of the emergency vehicle).

Figure 6:
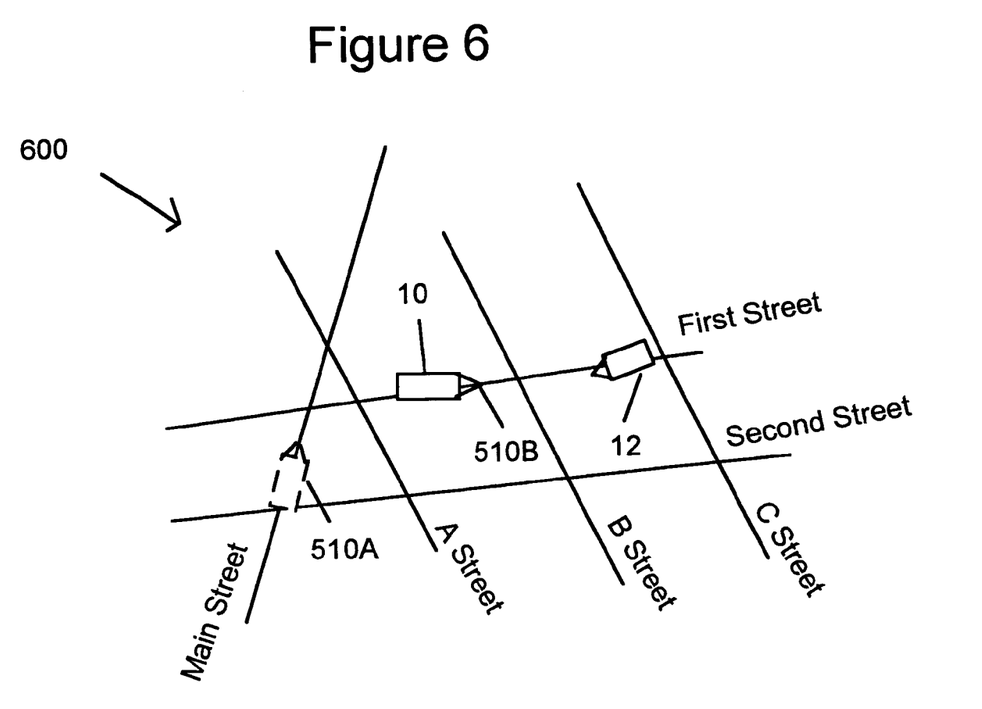
FIG. 6 is a diagram showing a map display that may be provided to a driver of a motor vehicle, in accordance with a fifth embodiment of the invention.

A fifth embodiment of the invention will be described below, with reference to FIG. 6. The fifth embodiment is compatible with any of the previous embodiments described above. The fifth embodiment provides a more overt warning to the motor vehicle operator when an emergency vehicle is determined to be in an upcoming driving path of the motor vehicle operator, or vice versa. A control unit determines a current road on which a motor vehicle is located, based on GPS information provided to the control unit. The control unit also determines a current road on which an emergency vehicle in the vicinity of the motor vehicle is located, based on reception of RF signals from the emergency vehicle as described with respect to other embodiments discussed previously. Like the other embodiments, the location of the motor vehicle and the emergency vehicle are shown on a map display. However, unlike the other embodiments, when it is determined that the motor vehicle is within a particular range of the emergency vehicle (e.g., within ⅓ mile of the emergency vehicle) and when it is also determined that the motor vehicle is traveling on a same road as the emergency vehicle is located, or when there is a possibility that the emergency vehicle and the motor vehicle will come to a same intersection from different roads. A logic circuit (part of the controller 36 in FIG. 2) determines, based on the current location, speed and direction of travel of the motor vehicle and based on the current location, speed and direction of travel of the emergency vehicle, whether or not these two vehicles might approach the same intersection at or near the same time. If this is the case, then in one embodiment the map display will include a "red line" that connects the motor vehicle and the emergency vehicle on their respective streets to the intersection where they may meet. For example, if the path of the emergency vehicle is perpendicular to the path of the motorist's vehicle, their intersection will be highlighted by a red line on the map display.

In one possible implementation, the screen display will be in color, whereby the emergency vehicle will be shown as a "delta shape", preferably in red, with the delta point used to show the direction of travel of the emergency vehicle. The motorist's vehicle would also be shown as a "delta shape:, but with a different color, such as green. That way, the motorist can readily identify his/her vehicle while at the same time readily identify the emergency vehicle on the map display. In the case of fixed emergency locations, such as school zones or handicapped crossings or road maintenance locations, these will be shown on the map display using a different type of icon (e.g., post) and using a different color (e.g., blue). In any of these instances, when the emergency situation is passed (e.g., the emergency vehicle passes through the intersection in question from a different direction prior to the motorist's vehicle coming to that same intersection), the "red line" is removed from the map display even though the RF transmission from the emergency vehicle is still being received and the "delta shape" icon for the emergency vehicle is still being shown on the map display.

In another possible implementation, the map display includes a highlighting feature in which an icon signifying the location of the emergency vehicle is shown in red, for example, while all of the other features on the map display are shown in a neutral color (e.g., black on a white background). With this implementation, the motor vehicle operator is alerted in a more definitive manner when a potential imminent situation is detected. For example, in FIG. 6, if the motor vehicle is at position 510A on Main Street and if the emergency vehicle is at position 12 on First Street on the map display 600, then no highlighting of the emergency vehicle would be provided on the map display 600 in that case. However, if the motor vehicle is at position 510B on First Street and if the emergency vehicle is at position 12 on First Street on the map display 600, then the emergency vehicle would be highlighted in red, for example, while the other portions of the map display would be in a more neutral color (e.g., black on a white background). That way, the motor vehicle operator would be visually alerted as to the emergency vehicle in its immediate driving path, and would not be visually alerted in other situations. In another possibility, when the emergency vehicle is driving on the same road as the motor vehicle and is behind the motor vehicle, whereby the emergency vehicle is presumably driving at a faster rate of speed, a similar type of "higher alerting" would be provided.

In another possible implementation of the fifth embodiment, the map display will provide a greater level of visual highlighting of the street or path that coincides with the path or the intersection point of the path of the receiving vehicle. The "red line" feature described above may be used to provide for an extra level of highlighting on the map display when the emergency vehicle is determined to be very close to the motor vehicle, irrespective as to whether not the emergency vehicle and the motor vehicle are on the same road. For example, the emergency vehicle icon will be highlighted in red, and will flash on the map display, when the emergency vehicle is determined to be within ¼ of a mile of the motor vehicle.

Also, in an alternative configuration of the fifth embodiment, an audible alarm is provided to the motor vehicle operator, which provides audible information (by way of a speech synthesizer and speaker, for example) as to where the emergency vehicle is currently located and the direction the emergency vehicle is going (if it is moving). In the fifth embodiment, the motor vehicle operator is only given a greater warning (visually by way of a red indication on the map display, and/or audibly by way of an alarm) as to a need to be alert to an imminent emergency situation that the motor vehicle operator is very close to. That way, the motor vehicle operator does not need to constantly look at the map display, which may cause accidents to occur due to the motor vehicle operator not paying full attention to driving.

Possible uses of the present invention are provided below. Emergency operators or patrolmen on duty are alerted to a location where they need assistance, or, in the case of patrolmen, they may have to stop a traffic violator. When their emergency vehicle warning systems are activated (e.g., by turning on the warning lights on a police vehicle), their location is broadcast within a prescribed area. School bus drivers activate their yellow and then red lights to take on children or let them off at school or at a bus stop near the children's' homes. Fire houses, police stations, etc., where vehicles frequently have to enter traffic, will have a permanently mounted transmitter to alter motorists of traffic entering the roadway, so that the motorists can take appropriate action. The permanently mounted transmitter at a fire station may be activated by opening the garage doors of the fire station, or by some other device that allows for manual operation of the RF emergency transmitter.

One possible scenario in which the present invention is useful is described below. Fire station number 109 receives a call of a fire at 1010 Locust Street, whereby one fire truck and one emergency medical technician (EMT) team are needed. As the doors of the firehouse are opened, the permanently mounted transmitter in the street is activated. Motorists in the vicinity of the fire station have their LCD screen activated with a map showing their location and the location of the emergency transmitter. A synthesized voice will warn each motorist that "Emergency vehicle entering roadway, ¼ mile ahead". A motorist will look at the map on his or her LCD screen, and will see that the location of the fire station is two blocks to his or her right. Based on this information, the motorist will avoid the road which the fire station is located on. The information provided on the LCD screen also can be used to alert the motorist to handicapped crossings, roadway workers, railroad workers, and equipment on the road. In yet another embodiment, the system according to the invention would be used to control navigation on waterways in order to minimize possible collisions with other watercraft and to aid in the separation of watercraft on the waterways. In yet another embodiment, the system according to the invention would be used to provide for an aircraft anti-collision system.

As the emergency vehicles enter traffic, they will begin broadcasting their locations. Motorists will be informed by their systems "Emergency traffic ahead, ⅛ mile moving towards you". Again, this may be two blocks to a motorists' right, but the system will show both the motorist's progress and the path of the emergency vehicles. If the emergency vehicles turn onto the same street as a motorist, this will be shown on that motorist's LCD screen, and a synthesized voice will say "Emergency traffic ahead, on the right". In certain embodiments described herein, the presence of the "red line" on the motorist's LCD screen will appear on the street being traveled, giving the motorist immediate confirmation that he or she may be impacted by the path taken by the emergency vehicle (the broadcasting vehicle). Additionally, the motorist may be provided with an audio alert, such as one that states "Emergency vehicle ahead, stationary." Again, by looking at the LCD screen and/or by listening to the audible warnings provided in the driver's compartment, the driver will know where to look for the patrolman in order to avoid an accident.

In case of school buses, when the driver starts the yellow light sequence, the transmitter begins broadcasting a signal with its location, direction and an additional radio code that identifies the transmitter as a school bus. A driver would hear "School bus ahead, ¼ mile", and the driver's map display would show both the bus location and the driver's location, so that the driver can be aware of the situation. The "red line" appears if both vehicles are on the same street, or if they are approaching the same intersection from different streets.

In the case where transmitters are located at stationary locations, such as timed crossings, a driver would hear "School zone ahead, ¼ mile", and the driver can take appropriate action to slow down. In yet another embodiment, the system according to the invention can be used in concert with the "Amber Alert" system that currently provides drivers with information as to a vehicle (e.g., license plate and make and model of vehicle) which may have a stolen child in the vehicle. In this embodiment, when an Amber Alert is made, then that information is received by the motorist's vehicle (e.g., either via RF or cellular transmissions), and the Amber Alert information is displayed on the map display of the vehicle as a text message. In one possible implementation, the Amber Alert would be displayed on the map display as long as the vehicle is in operation (and as long as the vehicle is receiving the Amber Alert information). In another possible implementation, the Amber Alter would be displayed on the map display only for a predetermined time period after receipt of this information, such as for 5 minutes. If the motorist later encountered the same Amber Alert at another location, that would not re-activate the display of this information on the map display, unless a portion of the Amber Alert information has changed from the previous display of that information on the map.

While different embodiments have been described herein, modification of the described embodiments may become apparent to those of ordinary skill in the art, following the teachings of the invention, without departing from the spirit and scope of the invention as set forth in the appended claims. For example, the method and system according to the invention is applicable to a completely digital communication system, whereby no analog to digital conversion of information received over-the-air would be required in that instance. Also, other frequency bands for transmitting information over-the-air in a limited range, beyond the one described above that uses the radio frequency range, may be utilized (e.g., infrared), while remaining within the scope of the invention. Furthermore, other possible communications means may be utilized to provide emergency vehicle location information to a motor vehicle operator, including Wi/Fi or cellular networks, whereby information received by these communications paths would be received by the motor vehicle along with GPS information that is received by a GPS receiver of the motor vehicle.

What is claimed is:

1. An emergency vehicle alert system for providing information as to a location of an emergency vehicle to a motor vehicle, the system comprising:
   a first GPS receiving unit that is provided on said emergency vehicle and that is configured to receive a plurality of GPS signals from a plurality of GPS satellites and to determine emergency vehicle location information of said emergency vehicle;
   a radio-wave transmitter unit that is provided on said emergency vehicle and that is configured to transmit said emergency vehicle location information by way of an emergency vehicle location signal that includes said emergency vehicle location information;
   a second GPS receiving unit that is provided on said motor vehicle and that is configured to receive a plurality of GPS signals from a plurality of GPS satellites and to determine vehicle location information of said motor vehicle as a result thereof;
   a radio-wave receiver unit that is provided on said motor vehicle and that is configured to receive the emergency location signal output by said radio-wave transmitter unit of said emergency vehicle; and
   a map display that is provided on said motor vehicle and that is configured to display, on a map, a current location of said motor vehicle as provided by the vehicle location information, and the map display configured to display, on the map, a current location of said emergency vehicle as provided by the emergency vehicle location information obtained from the emergency vehicle location signal received by said radio-wave receiver unit when said radio-wave receiver unit is in radio-wave communication range with respect to said radio-wave transmitter unit,
   wherein the map display displays said emergency vehicle as an icon on the map display with a different visual characteristic when said emergency vehicle is determined to be at a particular location relative to said motor vehicle.

2. The emergency vehicle alert system according to claim 1, wherein said emergency vehicle is one of a police vehicle, a fire station vehicle, and a school bus.

3. The emergency vehicle alert system according to claim 1, further comprising:
   an audible warning unit that is configured to output an audible alarm within a passenger compartment of said motor vehicle when said emergency vehicle location signal is received by said radio-wave receiver unit.

4. The emergency vehicle alert system according to claim 3, wherein said audible warning unit is configured to output computer-generated speech that provides information with respect to a particular street location and moving direction of said emergency vehicle with respect to said motor vehicle.

5. An emergency vehicle alert system for an emergency vehicle, comprising:
   a GPS receiving unit that is configured to receive a plurality of GPS signals from a plurality of GPS satellites and to determine emergency vehicle location information of said emergency vehicle as a result thereof;
   a radio-wave transmitter unit that is configured to transmit said emergency vehicle location information by way of an emergency vehicle location signal that includes said emergency vehicle location information;
   a radio-wave receiving unit that is configured to receive radio-wave signals from at least one other emergency vehicle that include information as to a current location of said other emergency vehicle;
   a controller that is configured to determine a latitude and longitude position of said emergency vehicle based on the plurality of GPS signals, and to determine a latitude and longitude position of said other emergency vehicle based on the received radio-wave signals; and
   a map display that is configured to display, on a map, a current location of said emergency vehicle and said other emergency vehicle,
   wherein the map display displays said other emergency vehicle as an icon on the map display with a different visual characteristic when said other emergency vehicle is determined to be at a particular location relative to said emergency vehicle.

6. The emergency vehicle alert system according to claim 5, wherein said emergency vehicle is one of a police vehicle, a fire station vehicle, and a school bus.

7. The emergency vehicle alert system according to claim 5, further comprising:
   an audible warning unit that is configured to output an audible alarm within a passenger compartment of said emergency vehicle when said radio signals output by said other emergency vehicle are received by said emergency vehicle.

8. The emergency vehicle alert system according to claim 7, wherein said audible warning unit is configured to output computer-generated speech that provides information with respect to a particular street location and moving direction of said other emergency vehicle with respect to said emergency vehicle.

9. An emergency vehicle alert system that is provided on a motor vehicle, the system comprising:
 a GPS receiving unit that is configured to receive a plurality of GPS signals from a plurality of GPS satellites and to determine vehicle location information of said motor vehicle as a result thereof;
 a radio-wave receiver unit that is configured to receive an emergency vehicle location signal output by an emergency vehicle; and
 a map display that is configured to display, on a map, a current location of said motor vehicle as provided by the vehicle location information as determined by said GPS receiving unit, and the map display configured to display, on the map, a current location of said emergency vehicle as obtained from the emergency vehicle location signal received by said radio-wave receiver unit when said radio-wave receiver unit is in radio-wave communication range with respect to said emergency vehicle,
 wherein the map display displays said emergency vehicle as an icon on the map display with a different visual characteristic when said emergency vehicle is determined to be within a predetermined distance from the motor vehicle as compared to when said emergency vehicle is determined to be greater than the predetermined distance from said motor vehicle.

10. The emergency vehicle alert system according to claim 9, wherein said emergency vehicle is one of a police vehicle, a fire station vehicle, and a school bus.

11. The emergency vehicle alert system according to claim 9, further comprising:
 an audible warning unit that is configured to output an audible alarm within a passenger compartment of said motor vehicle when said emergency vehicle location signal is received by said radio-wave receiver unit.

12. The emergency vehicle alert system according to claim 9, wherein said audible warning unit is configured to output computer-generated speech that provides information with respect to a particular street location and moving direction of said emergency vehicle with respect to said motor vehicle.

13. An emergency vehicle alert method that provides information as to a location of an emergency vehicle to a motor vehicle, the method comprising:
 receiving, by said emergency vehicle, a plurality of GPS signals from a plurality of GPS satellites, and determining emergency vehicle location information of said emergency vehicle as a result thereof;
 transmitting, by said emergency vehicle, said emergency vehicle location information by way of an emergency vehicle location signal;
 receiving, by said motor vehicle, a plurality of GPS signals from a plurality of GPS satellites, and determining vehicle location information of said motor vehicle as a result thereof;
 receiving, when the motor vehicle is within a predetermined distance of said emergency vehicle, the emergency location signal output by said emergency vehicle;
 displaying, on a map, a) a current location of said motor vehicle as a first icon on the map as determined by the vehicle location information, and b) a current location of said emergency vehicle as a second icon on the map as determined from information in said emergency vehicle location signal,
 wherein the second icon has a different visual characteristic as compared to the first icon.

14. The method according to claim 13, wherein said emergency vehicle is one of a police vehicle, a fire station vehicle, and a school bus.

15. The method according to claim 13, further comprising:
 outputting an audible alarm within a passenger compartment of said motor vehicle when said emergency vehicle location signal is received by said motor vehicle.

16. The method according to claim 15, wherein said audible alarm provides information with respect to a particular street location and moving direction of said emergency vehicle with respect to said motor vehicle.

* * * * *